(12) United States Patent
Tazik et al.

(10) Patent No.: US 11,568,658 B2
(45) Date of Patent: Jan. 31, 2023

(54) APPARATUS AND METHODS FOR MULTI-TARGET DETECTION

(71) Applicant: CHEMIMAGE CORPORATION, Pittsburgh, PA (US)

(72) Inventors: Shawna Tazik, Pittsburgh, PA (US); Matthew Nelson, Harrison City, PA (US); Patrick J. Treado, Pittsburgh, PA (US); Ryan J. Priore, Wexford, PA (US)

(73) Assignee: CHEMIMAGE CORPORATION, Pittsburgh, PA (US)

( * ) Notice: Subject to any disclaimer, the term of this patent is extended or adjusted under 35 U.S.C. 154(b) by 123 days.

(21) Appl. No.: 17/121,527

(22) Filed: Dec. 14, 2020

(65) Prior Publication Data
US 2021/0182634 A1 Jun. 17, 2021

Related U.S. Application Data

(60) Provisional application No. 62/947,808, filed on Dec. 13, 2019.

(51) Int. Cl.
*G06V 30/198* (2022.01)
*G06V 30/194* (2022.01)
*G06K 9/62* (2022.01)
*G06K 9/00* (2022.01)

(52) U.S. Cl.
CPC ....... *G06V 30/194* (2022.01); *G06K 9/00503* (2013.01); *G06K 9/628* (2013.01); *G06K 9/6256* (2013.01)

(58) Field of Classification Search
CPC ............ G06V 30/194; G06K 9/00503; G06K 9/6256; G06K 9/628
See application file for complete search history.

(56) References Cited

U.S. PATENT DOCUMENTS

| | | | |
|---|---|---|---|
| 9,157,800 B2 | 10/2015 | Priore et al. | |
| 2010/0271629 A1* | 10/2010 | Beckstead | G01J 3/443 356/301 |
| 2014/0198315 A1 | 7/2014 | Priore et al. | |
| 2014/0300897 A1 | 10/2014 | Treado et al. | |
| 2018/0263475 A1* | 9/2018 | Treado | A61B 1/00009 |

\* cited by examiner

Primary Examiner — Edward Park
(74) *Attorney, Agent, or Firm* — DLA Piper LLP (US)

(57) ABSTRACT

A method for multi-target detection and an apparatus for multi-target detection are capable of detecting at least two targets in real time or near real time. The real-time detection or near real time detection can be achieved by at least one of a Recipe Group Approach, an End Member Grouping Approach, and a Pixelated Grouping Based Approach.

22 Claims, 13 Drawing Sheets

APPARATUS AND METHODS FOR MULTI-TARGET DETECTION

CROSS-REFERENCE TO RELATED APPLICATIONS

This application claims priority to U.S. Provisional Application Ser. No. 62/947,808 filed on Dec. 13, 2019, the content of which is hereby incorporated by reference in its entirety.

BACKGROUND

Spectroscopic imaging combines digital imaging and optical spectroscopy techniques, including Raman scattering, fluorescence, photoluminescence, laser induced breakdown, ultraviolet, visible, and infrared absorption spectroscopies in order to perform chemical analysis of materials. In some literature, this is referred to as hyperspectral imaging or chemical imaging. Such techniques are useful for analyzing various compounds.

One continuing challenge is to achieve detection tasks in real time, or at least close to real time. By achieving detection tasks in real time, spectroscopic imaging can be used in new applications, including surgical imaging, contraband detection, explosives detection, and the like. In each of these applications, there is a need for the user to visualize the target in real time because the user is about to or is presently interacting with the target or a person or object that that might contain the target. Another challenge is for spectroscopic imaging to be used in complex scenarios involving multiple different targets that must be detected. The present disclosure is addresses these and other challenges of current spectroscopic imaging technologies.

SUMMARY

The present disclosure provides describes several embodiments of apparatus and methods for multi-target detection. The following embodiments are exemplary and are not intended to limit the disclosure.

In one embodiment, there is a method of detecting at least two targets, the method comprising: illuminating a first target with illuminating photons to thereby generate first interacted photons; illuminating a second target with illuminating photons to thereby generate second interacted photons; optically separating portions of the first interacted photons and the second interacted photons; filtering the first interacted photons and the second interacted photons with at least one of a conformal filter (CF) and a multi conjugate filter (MCF), wherein the CF or MCF is tuned with a single first recipe, to thereby produce filtered first interacted photons and filtered second interacted photons; and detecting, with an image sensor, a spectral signature of the first target and the second target by analyzing the filtered first interacted photons and the filtered second interacted photons.

In another embodiment, the first interacted photons and the second interacted photons are optically separated by polarizing and are each separately polarized.

In another embodiment, the first recipe that tunes the CF or MCF does not change.

In another embodiment, the at least one CF or MCF is a pixelated filter that comprises multiple CF or MCF arranged into a matrix configuration.

In another embodiment, the first target and the second target are detected in real time.

In another embodiment, the illuminating photons are modulated.

In another embodiment, the method further comprises: filtering the first interacted photons and the second interacted photons with the at least one of the CF and MCF, wherein the CF or MCF is tuned with a single second recipe.

In one embodiment, there is a multi-target detection apparatus, the multi-target detection apparatus comprising: at least one optical separator to separate portions of one or more of first interacted photons from a first target and second interacted photons from a second target; at least one of a conformal filter (CF) and a multi conjugate filter (MCF) positioned within an optical path of one or more of the first interacted photons and the second interacted photons; at least one CF or MCF that causes each of the first interacted photons and the second interacted photons to be tuned with a single first recipe to thereby produce filtered first interacted photons and filtered second interacted photons; an image sensor positioned within the optical path of the one or more first interacted photons and within the optical path of the second interacted photons in order to collect one or more of the filtered first interacted photons and the filtered second interacted photons; at least one processor that during operation of the multi-target detection apparatus tunes the CF or MCF to the single first recipe to thereby produce the first interacted photons and the second interacted photons.

In another embodiment, the optical separator is a polarizer and during operation, the first interacted photons and the second interacted photons are each separately polarized.

In another embodiment, the first recipe that tunes the CF or MCF does not change during operation of the apparatus.

In another embodiment, the at least one CF or MCF is a pixelated filter that comprises multiple CF or MCF arranged into a matrix configuration.

In another embodiment, during operation of the apparatus, the first target and the second target are detected in real time.

In one embodiment, there is a computer program product for detecting at least two targets, wherein the computer program product is embodied by instructions on a non-transitory computer readable storage medium that, when executed by a processor, cause: at least optical separator to optically separate one or more of the first interacted photons and the second interacted photons; at least one of a conformal filter (CF) and a multi conjugate filter (MCF) to be tuned with a single first recipe to thereby produce filtered first interacted photons and filtered second interacted photons, wherein the CF or the MCF are positioned within an optical path of the one or more of first interacted photons and second interacted photons; an image sensor to collect one or more of the filtered first interacted photons and the filtered second interacted photons, wherein the image sensor is positioned within the optical path of the one or more first interacted photons and within the optical path of the second interacted photons; the processor to tune the CF or MCF to a single first recipe and thereby produce first interacted photons and second interacted photons during operation of the multi-target detection apparatus.

In another embodiment, the optical separator is a polarizer and the instructions, when executed by a processor, further cause the polarizer to separately polarize the first interacted photons and the second interacted photons.

In another embodiment, the first recipe that tunes the CF or MCF does not change during operation.

In another embodiment, the at least one CF or MCF is a pixelated filter that comprises multiple CF or MCF arranged into a matrix configuration.

In another embodiment, during operation, the first target and the second target are detected in real time.

In another embodiment, the instructions when executed by the processor further cause an illumination source to modulate illuminating photons.

In another embodiment, the instructions when executed by the processor further cause filtering the first interacted photons and the second interacted photons by tuning the CF or MCF to a second recipe.

Other embodiments are also provided.

In one embodiment, there is a method of detecting at least two targets, the method comprising: illuminating a first target with illuminating photons to thereby generate first interacted photons; illuminating a second target with illuminating photons to thereby generate second interacted photons; polarizing the first interacted photons and the second interacted photons; filtering the first interacted photons and the second interacted photons with at least one of a conformal filter (CF) and a multi conjugate filter (MCF), wherein the CF or MCF is tuned with a single recipe, to thereby produce filtered first interacted photons and filtered second interacted photons; and detecting, with an image sensor, a spectral signature of the first target and the second target by analyzing the filtered first interacted photons and the filtered second interacted photons.

In another embodiment, the first interacted photons and the second interacted photons are each separately polarized.

In another embodiment, the recipe that tunes the CF or MCF does not change.

In another embodiment, the at least one CF or MCF is a pixelated filter that comprises multiple CF or MCF arranged into a matrix configuration.

In another embodiment, the first target and the second target are detected in real time.

In one embodiment, a multi-target detection apparatus comprises: at least one polarizer to polarize one or more of the first interacted photons and the second interacted photons; at least one of a conformal filter (CF) and a multi conjugate filter (MCF) positioned within the optical path of the one or more of first interacted photons and second interacted photons; at least one CF or MCF that causes each to be tuned with a single recipe, to thereby produce filtered first interacted photons and filtered second interacted photons; an image sensor positioned within the optical path of the one or more first interacted photons and within the optical path of the second interacted photons in order to collect one or more of the filtered first interacted photons and the filtered second interacted photons; at least one processor that during operation of the multi-target detection apparatus causes the CF or MCF to tune to a single recipe and thereby produce first interacted photons and second interacted photons.

In another embodiment, the first interacted photons and the second interacted photons are each separately polarized.

In another embodiment, the recipe that tunes the CF or MCF does not change during operation.

In another embodiment, the at least one CF or MCF is a pixelated filter that comprises multiple CF or MCF arranged into a matrix configuration.

In another embodiment, during operation, the first target and the second target are detected in real time.

BRIEF DESCRIPTION OF THE DRAWINGS

Aspects, features, benefits and advantages of the embodiments described herein will be apparent with regard to the following description, appended claims, and accompanying drawings.

DETAILED DESCRIPTION

Figure 1:
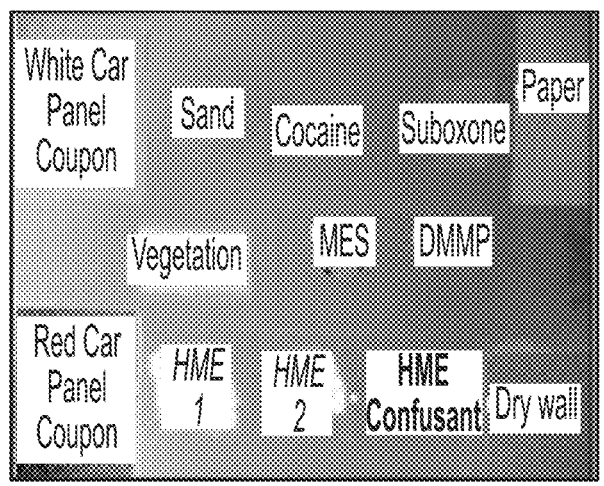
FIG. 1 depicts a score image output that is representative of samples, and demonstrates CF imaging of SWIR interacted photons.

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

As used herein, "target" means a single material of interest that is capable of being detected by spectral imaging. The target is not limited, and includes one or more of body tissues, body fluids, explosives, drugs, toxins, fruit, cheese, meat, alcohol, flavor compounds, Chemical Warfare Agents (CWA), Toxic Industrial Chemicals (TIC), and Non-Traditional Agents (NTA).

As used herein, "target group" means two or more materials of interest that are each capable of being detected by spectral imaging. The targets that make up the target grouping are not limited and include one or more of body tissues, body fluids, explosives, drugs, toxins, fruit, cheese, meat, alcohol, flavor compounds, Chemical Warfare Agents (CWA), Toxic Industrial Chemicals (TIC), and Non-Traditional Agents (NTA). In some embodiments, operation of a spectral imaging apparatus with a single recipe results in the detection of the two or more of the materials of interest that make up the target group. In alternative embodiments, operation of a spectral imaging apparatus with a single recipe cannot result in the detection of the two or more materials of interest that make up the target group.

As used herein, "real time" means that the multi-target detection apparatus operates or the method is performed with a level of responsiveness such that a user senses that the apparatus or the method is sufficiently immediate, or such that the apparatus operation or the method performance is sufficient to satisfy the demands of a given process. The measurement of whether a given apparatus or process are in real time are not limited, and include one or more of measures of frame rate, frequency, and latency. Examples of real time applications or concepts of operations (CONOPs) include, but are not limited to (1) stationary sensor configured to detect one or more stationary targets, (2) stationary sensor configured to detect a moving target, (3) moving sensor configured to detect a stationary target, and (4) a moving sensor configured to detect a moving target.

As used herein, "recipe" means the operational configuration of a multi-target detection apparatus. The operational configuration that makes up a recipe is not limited and includes the specified tuning states of the filters as defined by electrical measurements, the specified tuning states of the filters as defined by the passband wavelengths that are permitted through the filters, and methods for processing the images that are generated by the tuning states in order to generate a detection. The recipe does not describe the physical configuration of the multi-target detection apparatus, rather, it describes how the filters behave during operation and/or are controlled by a processor during operation.

In some embodiments, the multi-target detection apparatus operates in real time, thereby generating an composite detection image at a rate of at least about 10 frames per second, at least about 15 frames per second, at least about 18 frames per second, at least about 20 frames per second, at least about 24 frames per second, at least about 25 frames per second, at least about 30 frames per second, and any combination of those ranges. In some embodiments, the multi-target detection apparatus operates in real time, thereby generating an image at a rate of about 10 frames per second, about 15 frames per second, about 18 framed per second, about 20 frames per second, about 24 framed per second, about 25 frames per second, about 30 frames per second, about 50 frames per second, about 60 frames per second, or any range that is defined by two or more of the above framerates.

In some embodiments, the multi-target detection apparatus operates in real time with respect to performing an open surgical procedure. In some embodiments, the multi-target detection apparatus operates in real time with respect to performing an endoscopic surgical procedure. In some embodiments, the multi-target detection apparatus operates in real time with respect to inspecting a stationary object for explosive compounds. In some embodiments, the multi-target detection apparatus operates in real time with respect to inspecting one or more objects that are moving in the scene.

In some embodiments, an image sensor is positioned in the optical path to collect interacted photons from at least one target. By way of example, the image sensor can include one or more imaging devices, such as a CCD detector, an InGaAs detector, a CMOS detector, an InSb detector, a MCT detector, or combinations thereof, although other types and/or numbers of image sensors may be employed. One or more optics, such as mirrors and/or lenses, may be utilized to direct the interacted photons onto the image sensor. The interacted photons comprise one or more of photons absorbed by the target, photons reflected from the target, photons scattered by the target, or photons emitted by the target.

In some embodiments, at least one processor is included in the multi target detection apparatus to execute programmed instructions stored in a memory of the multi target detection apparatus for any number of the functions described an illustrated herein. The at least one processor of the multi target detection apparatus may include one or more central processing units (CPUs) or general purpose processors with one or more processing cores, for example, although other types of processor(s) can also be used.

The memory of the multi target detection apparatus stores these programmed instructions for one or more aspects of the present technology as described and illustrated herein, although some or all of the programmed instructions could be stored elsewhere. A variety of different types of memory storage devices, such as random access memory (RAM), read only memory (ROM), hard disk, solid state drives (SSDs), flash memory, and/or any other non-transitory computer readable storage medium which is read from and written to by a magnetic, optical, or other reading and writing system that is coupled to the processor(s), can be used for the memory.

Real-Time Detection and Dual Polarization Imaging

In at least one embodiment, a multi-target detection apparatus includes at least two liquid crystal filters. The liquid crystal filters are configured so that they can each be independently tuned. In one embodiment, the two liquid crystal filters are operated in an oppositely polarized state. When the at least two liquid crystal filters are tuned to two different states, imagery that is formed by the interaction of the liquid crystal filters is collected by using one or two camera cameras. Because the two measurements are required to produce the score image are collected simultaneously, and because the score image forms the basis of target detection, it is possible to achieve detection at rates that approach the frame rate of at least one camera.

In some embodiments, the multi-target detection apparatus includes elements of a dual polarization conformal imaging apparatus. Dual polarization conformal imaging is described, for example, in U.S. Pat. No. 9,157,800 entitled "SYSTEM AND METHOD FOR ASSESSING ANALYTES USING CONFORMAL FILTERS AND DUAL POLARIZATION" to Priore et al., which was patented on Oct. 13, 2015, the entirety of which is incorporated by reference herein.

In still further embodiments, the multi-target detection apparatus includes any filter or any plurality of filters that are configured or tuned to permit photons to pass through, where the photons have one or more selected wavelengths of light. Examples of such filters include one or more of liquid crystal filters (including multiconjugate filters, conformal filters, Lyot liquid crystal tunable filters, Evans split-element liquid crystal tunable filters, Solc liquid crystal tunable filters), multivariate optical element (MOE) filters, snapshot filters, or Fiber Array Spectral Translation (FAST) filters. In some embodiments, the filter includes a Fabry-Perot interferometer or a spatial heterodyne spectrometer.

In other embodiments, the filter is omitted and the multi-target detection apparatus is used in conjunction with an illumination source that can be modulated. Examples of illumination sources that can be modulated include one or more of light emitting diodes (LED) or lasers.

Optical Path Configuration

Figure 19:
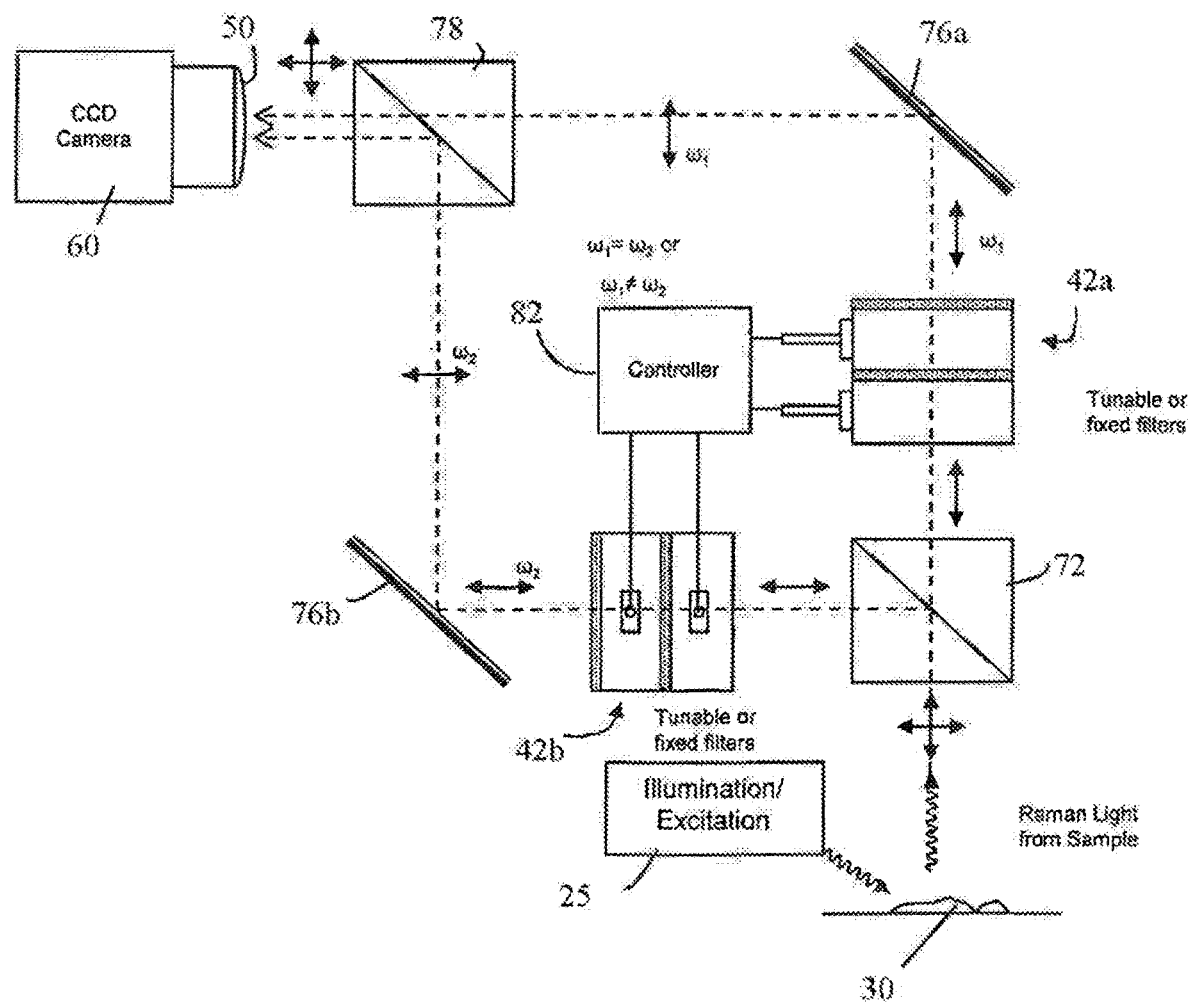
FIG. 19 depicts one embodiment of a multi-target detection apparatus, which is configured as a single camera, dual channel, and having dual polarization.

Referring now to FIG. 19 one embodiment of a multi-target detection apparatus is depicted, which is configured as a single camera, dual channel, and having dual polarization. The sample 30 is illuminated and/or excited by an illumination source 25. In FIG. 19, two independently tunable CF 42a, 42b along distinct orthogonal beam paths for the orthogonal components emerge from polarizing beam splitter 72. It should be noted that while the depicted embodiments describe a polarizing beam splitter, this feature is not limited and can include any optical structure that separates photons (referred to herein as a photon separator "photon separator"), including one or more of a polarizer, a polarizing beam splitter, a reflecting beam splitter (for example, a partially silvered mirror), or a dicroic mirror prism. In one embodiment, the CF comprises one or more of a multi-conjugate liquid crystal tunable filter, an acousto-optical tunable filter, a Lyot liquid crystal tunable filter, an Evans split-element liquid crystal tunable filter, a Solc liquid crystal tunable filter, a ferroelectric liquid crystal tunable filter, and a Fabry Perot liquid crystal tunable filter. In some embodiments, the CF comprises one or more a modified liquid crystal tunable filter and a liquid crystal tunable filter configured to operate in conjunction with a Look Up Table (LUT).

The illumination source is not limited. In some embodiments, the illumination source is not modulated, which means that during operation of the multi-target detection apparatus the wavelengths, intensity, and other characteristics of the light (photons) that are emitted by the illumination source do not change substantively. Examples of illumination sources that are not modulated include one or more of an incandescent lamp, halogen lamp, light emitting diode (LED), quantum cascade laser, quantum dot laser, external cavity laser, chemical laser, solid state laser, organic light emitting diode (OLED), electroluminescent device, fluorescent light, gas discharge lamp, metal halide lamp, xenon arc lamp, induction lamp, or combinations thereof. The illumination source that is not modulated emits or is configured to emit one of more wavelengths or ranges of wavelengths which can include ultraviolet (UV), visible (VIS), near infrared (NIR), visible-near infrared (VIS-NIR), shortwave infrared (SWIR), extended shortwave infrared (eSWIR), near infrared-extended shortwave infrared (NIR-eSWIR). These classifications correspond to wavelengths of about 180 nm to about 380 nm (UV), about 380 nm to about 720 nm (VIS), about 400 nm to about 1100 nm (VIS-NIR), about 850 nm to about 1800 nm (SWIR), about 1200 nm to about 2450 nm (eSWIR), and about 720 nm to about 2500 nm (NIR-eSWIR).

In other embodiments, the illumination source is modulated, which means that during operation of the multi-target detection apparatus, the wavelengths, intensity, or other characteristics of the light (photons) that are emitted by the illumination source change. Examples of illumination sources that are modulated include one or more of an incandescent lamp, halogen lamp, light emitting diode (LED), quantum cascade laser, quantum dot laser, external cavity laser, chemical laser, solid state laser, organic light emitting diode (OLED), electroluminescent device, fluorescent light, gas discharge lamp, metal halide lamp, xenon arc lamp, induction lamp, or combinations thereof. The illumination source that is modulated emits or is configured to emit one of more wavelengths or ranges of wavelengths which can include ultraviolet (UV), visible (VIS), near infrared (NIR), visible-near infrared (VIS-NIR), shortwave infrared (SWIR), extended shortwave infrared (eSWIR), near infrared-extended shortwave infrared (NIR-eSWIR). These classifications correspond to wavelengths of about 180 nm to about 380 nm (UV), about 380 nm to about 720 nm (VIS), about 400 nm to about 1100 nm (VIS-NIR), about 850 nm to about 1800 nm (SWIR), about 1200 nm to about 2450 nm (eSWIR), and about 720 nm to about 2500 nm (NIR-eSWIR).

In this arrangement, the paths of the filtered beams are not parallel through the conformal filters 42a, 42b, but are directed by appropriate reflectors (e.g., mirrors) 76a, 76b to a beam combiner 78 (which may be a polarizing cube or polarizing beam splitter as illustrated) at which the orthogonal components, which can be at the same or different spectral shapes, are combined. In one embodiment, the components may be combined and directed to a detector 60 through a lens assembly 50. In another embodiment, the components may be kept separate as they are directed to the detector 60. However, the beam paths from one beam splitter 72 to the other 78 (via individual LCTFs 42a, 42b) may be made symmetrical to avoid, for example, the need for infinitely-corrected optics.

Still referring to FIG. 19, the detector 60 comprises a CCD detector. However, the present disclosure contemplates that the detector 60 may comprise other types of detectors including but not limited to: a CCD detector, a CMOS detector, an InGaAs detector, a platinum silicide (PtSi) detector, indium antimonide (InSb) detector, a mercury cadmium telluride (HgCdTe) detector, a colloidal quantum dot (CQD) detector, and combinations thereof. In some embodiments each or the combination of the above-listed detectors is a FPA detector. In some embodiments, each of the above detectors may include quantum dots to tune their bandgaps and/or alter sensitivity to different wavelengths.

In FIG. 19, the two conformal filters 42a, 42b may be tuned in unison using a conformal filter controller 82. It is possible to configure the controller 82 to independently tune the conformal filters 42a, 42b that respectively process orthogonal components of the input. Therefore, by appropriate control, the conformal filters can be tuned to the same spectral shape or to two different spectral shapes at the same time. The controller 82 may be programmable or implemented in software to allow a user to selectively tune each conformal filter 42a, 42b as desired.

In FIG. 19, a fast switching mechanism (not shown) may be provided to switch between the two views (or spectral images) corresponding to spectral data collected by the detector 60 from each of the conformal filters 42a, 42b.

Figure 2:
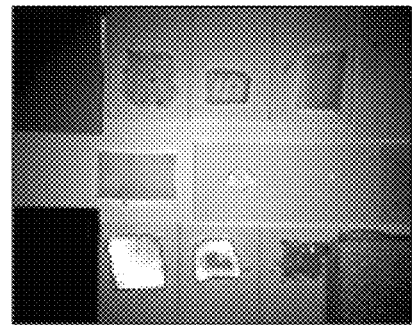
FIG. 2 depicts a false color composite detection image output that is representative of samples, and demonstrates CF imaging of SWIR interacted photons.

Alternatively, the two spectral views or images (from two separate conformal filters) may be combined or overlaid into a single image, for example, to increase contrast or intensity or for comparison purposes. The embodiment in FIG. 2 is shown to include a single CCD detector 60 to capture the filtered signals received from the conformal filters 42a, 42b.

Figure 20:
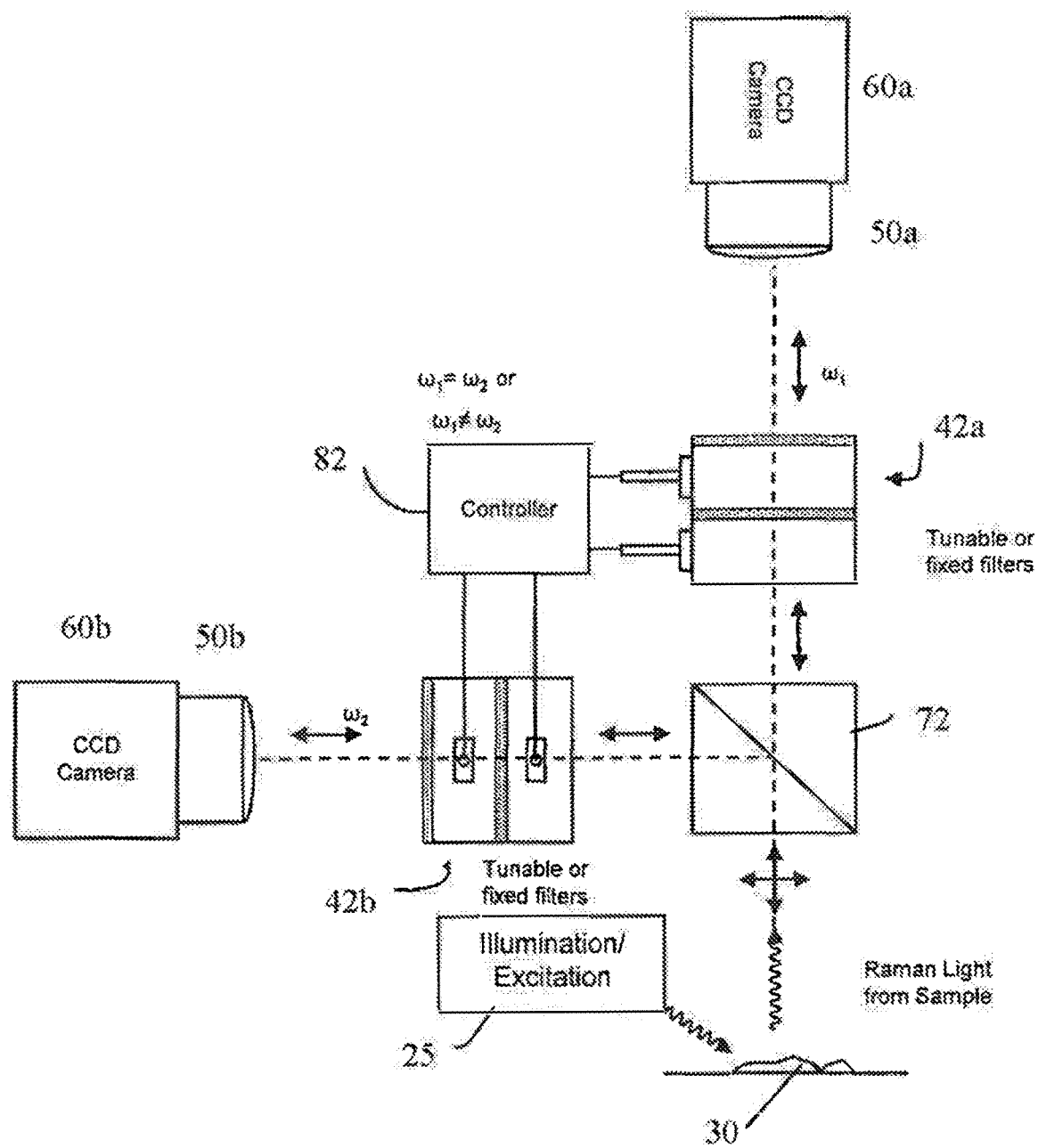
FIG. 20 depicts another embodiment of a multi-target detection apparatus, which is configured with dual cameras and dual channels.

In another embodiment, the reflectors 76a, 76b, and the beam combiner 78 may be removed, and two detectors may be used. An exemplary embodiment of such a configuration is illustrated in FIG. 20. Each detector 60a and 60b may be optically coupled to a corresponding one of the two conformal filters 42a, 42b to capture filtered signals from the conformal filters and to responsively generate electronic signals that enable display of spectral images of the illuminated sample 30. The present disclosure contemplates that any number of optical filters and associated detectors may be used to achieve the benefit of dual polarization as described herein.

In one embodiment, the two filtered signals may be detected simultaneously. As discussed herein, simultaneous detection of two different wavelengths holds potential for real-time detection when displayed in a non-overlapping configuration (side-by-side, top to bottom, etc.). In another embodiment, the two filtered signals may be detected sequentially.

It is noted here that although laser light may be coherent, the light received from the sample 30 (e.g., light emitted, scattered, absorbed, and/or reflected) and fed to the conformal filters 42a, 42b may not be coherent. Therefore, wavefront errors may not be present or may be substantially avoided in the two conformal filter versions in FIGS. 20 and 21 because of processing of non-coherent light by each conformal filter 42a, 42b.

Figure 21:
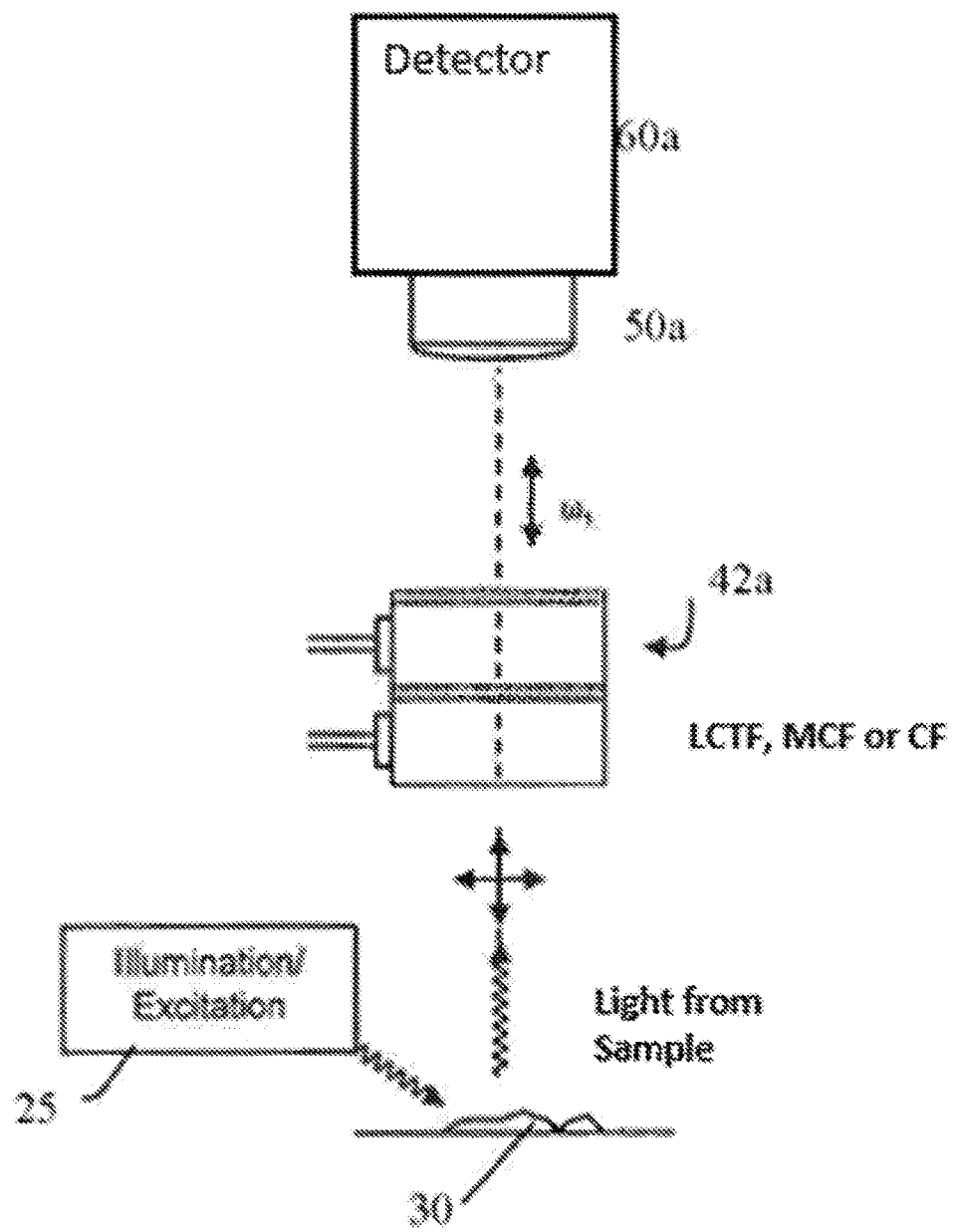
FIG. 21 depicts another embodiment of a multi-target detection apparatus, which is configured with a single camera and a single channel.

In another embodiment, a single camera, single channel apparatus operates in single polarization, as depicted in FIG. 21, which includes only a single detector 60a and filter 42a to analyze the light from sample 30 that is illuminate by photons that are generated by illumination source 25.

Multi-Target Detection: Recipe Group Approach

In a first embodiment of multi-target detection which is called the "Recipe Group Approach," multiple recipes are created and are contained within a single recipe group. In this first embodiment, each recipe corresponds to a single target or a target group, and each recipe contains the appropriate wavelength or passband selection information associated with the target or the target group. Thus, the recipe will result in the detection of a corresponding target or target group if that target or target group is present in the unknown sample.

In the Recipe Group Approach, only a single recipe is selected at a given time for configuring the multi-target detection apparatus. Therefore, at a given time, the multi-target detection apparatus collects interacted photons filtered according to one recipe, and thus can only detect target(s) or target group(s) that correspond to that single recipe. During operation, the multi-target detection apparatus will be configured for a first recipe, a second recipe, a third recipe, a fourth recipe, and so forth. As a result, for some recipe groups, recipes, targets, and target groups, this technique is not a real time approach. However, in configurations where the recipe group only includes a limited number of recipes, and where the target or target group corresponds sufficiently to those recipes, the Recipe Group Approach results in detection that approaches but does not achieve real time performance.

For example, one such real-time capable recipe group is where the recipe group only contains a single recipe, captures the necessary spectral information in two single wavelength selections or two multi-passband selections, and is configured to achieve dual polarization imaging.

Multi-Target Detection: End Member Grouping Approach

In another embodiment of multi-target detection which is called the "End Member Grouping Approach," at least two "end member" targets are grouped into a single target group. The end member targets are those targets that are known to be detectable by a multi-target detection apparatus that is configured according to a single recipe. By selecting appropriate end members for analysis, the End Member Grouping Approach achieves real time detection if it is operated within a dual polarization multi-target detection apparatus.

The end member targets are not limited, and in some instances are compositionally representative of the group. In one embodiment, for example, the group is explosives. In the group of explosives, end member targets include one or more ammonia, urea, organic compounds that contain the —$NO_2$ group, organic compounds that contain the —$ONO_2$ group, and organic compounds that contain the —$NHNO_2$ group, 2,4,6-trinitrotoluene (TNT), 1,3,5-trinitro-1,3,5-triazinane (RDX), C-4 (Composition C-4, a plastic explosive that contains RDX), and 1,3,5,7-tetranitro-1,3,5,7-tetrazocane (HMX). However, in other embodiments, such as those depicted in FIGS. 1-3, groupings can be performed on multiple end members that have dissimilar underlying spectroscopies while still achieving improved detection.

Multi-Target Detection: Pixelated Filter Approach

In another embodiment of multi-target detection which is called the "Pixelated Filter Approach," multiple Conformal Filters (CF) or Multi-Conjugate Filters (MCF) are arranged in a matrix configuration and placed in the optical path of the multi-target image apparatus. In this embodiment, photons travel to the surface of a sample, and after interacting with the surface of a sample and, optionally, any target(s) present on the surface of the sample, the photons are collected by the multi-target detection apparatus of the disclosure. After interacting with the surface of the sample and any targets(s) present on the surface of the sample, the photons are described as interacted photons.

In the Pixelated Filter Approach, the multiple CFs or MCFs that are placed within the optical path are arranged in a matrix configuration. The matrix configuration is not limited. In some embodiments, the matrix configuration of the filters are 2×2 tiles, 3×3 tiles, 4×4 tiles, 5×5 tiles, and so forth. In accordance with this configuration, it is possible to select a different recipe that controls the behavior of each of the CF or MCF tiles. Furthermore, different targets or target groups that require different corresponding recipes can nonetheless be detected at the same time and via the same optical path. As a result of being able to simultaneously configure the pixelated conformal filter to correspond to different targets or target groups, the Pixelated Filter Approach achieves real time detection.

Figure 22:
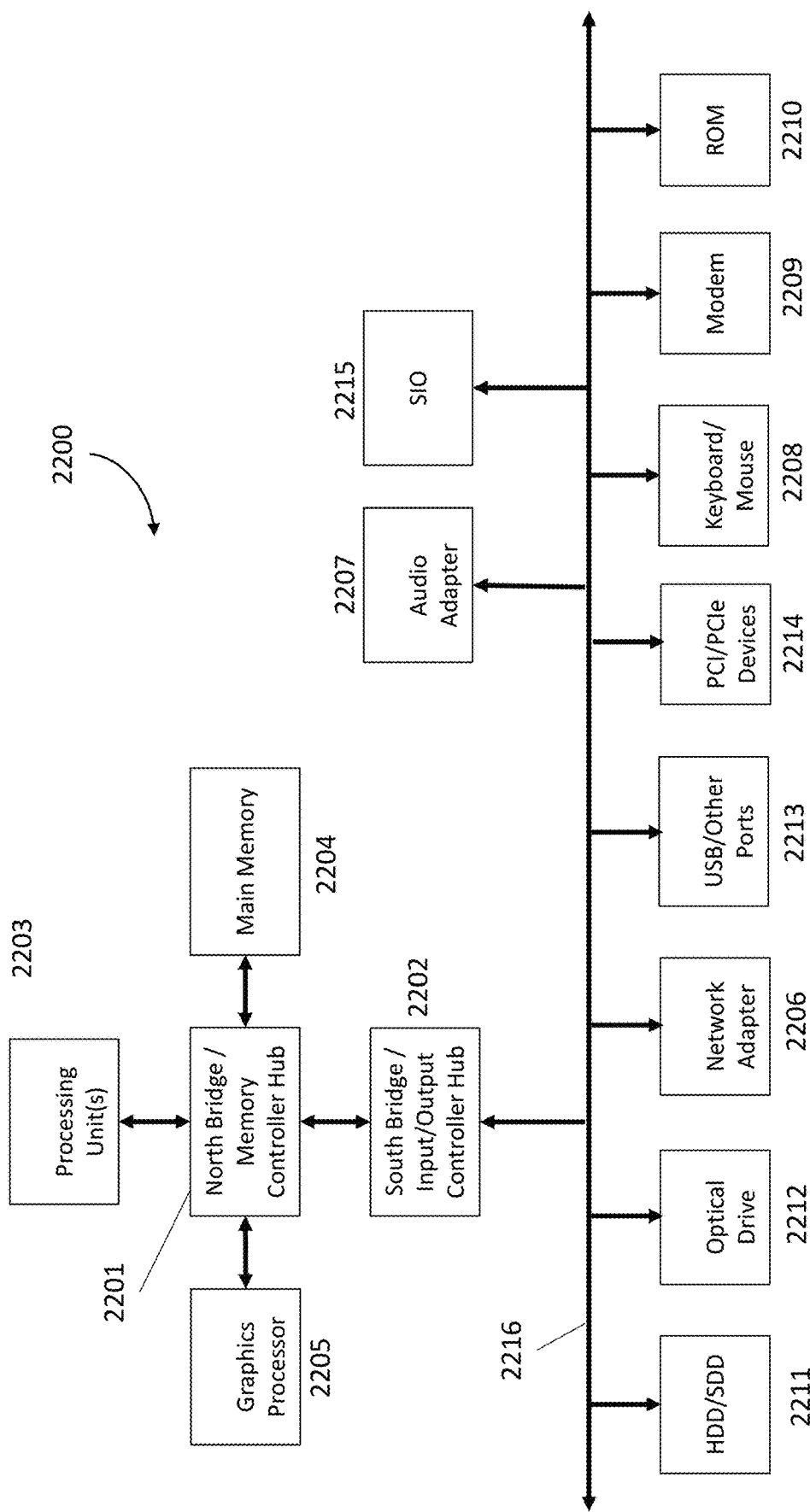
FIG. 22 illustrates a block diagram of an illustrative data processing system in accordance with various embodiments of the disclosure.

FIG. 22 illustrates a block diagram of an illustrative data processing system 2200 in which aspects of the illustrative embodiments are implemented. The data processing system 2200 is an example of a computer, such as a server or client, in which computer usable code or instructions implementing the process for illustrative embodiments of the present invention are located. In some embodiments, the data processing system 2200 may be a server computing device. For example, data processing system 2200 can be implemented in a server or another similar computing device operably connected to the multi-target detection apparatus as described herein. The data processing system 2200 an be configured to, for example, transmit and receive information related to the targets and/or images which are analyze by the multi-target detection apparatus of the disclosure.

In a depicted example, data processing system 2200 can employ a hub architecture including a north bridge and memory controller hub (NB/MCH) 2201 and south bridge and input/output (I/O) controller hub (SB/ICH) 2202. Processing unit 2203, main memory 2204, and graphics processor 2205 can be connected to the NB/MCH 1301. Graphics processor 2205 can be connected to the NB/MCH 2201 through, for example, an accelerated graphics port (AGP) or a peripheral component interconnect express (PCIe or PCI-e) port.

In the depicted example, a network adapter 2206 connects to the SB/ICH 2202. An audio adapter 2207, keyboard and mouse adapter 2208, modem 2209, read only memory (ROM) 2210, hard disk drive or solid state drive (HDD/SDD) 2211, optical drive (for example, CD or DVD or Blu Ray™) 2212, universal serial bus (USB) ports and other communication ports 2213, and PCI/PCIe devices 2214 may connect to the SB/ICH 2202 through bus system 2216. PCI/PCIe devices 2214 may include Ethernet adapters, add-in cards, and PC cards for notebook computers. ROM 2210 may be, for example, a flash basic input/output system (BIOS) or Unified Extensible Firmware Interface (UEFI). The HDD/SDD 2211 and optical drive 2212 can use an integrated drive electronics (IDE), serial advanced technology attachment (SATA), or PCIe interface. A super I/O (SIO) device 2215 can be connected to the SB/ICH 2202.

An operating system can run on the processing unit 2203. The operating system can coordinate and provide control of various components within the data processing system 2200. As a client, the operating system can be a commercially available operating system, such as Microsoft Windows, commercial Unix-based systems such as MacOS®, or any version of Linux®. An object-oriented programming system, such as the Java™ programming system, may run in conjunction with the operating system and provide calls to the operating system from the object-oriented programs or applications executing on the data processing system 2200. As a server, the data processing system 2200 can be an IBM® eServer™ System® running the Advanced Interactive Executive operating system or the Linux® operating system, or Microsoft Windows Server. The data processing system 2200 can be a symmetric multiprocessor (SMP) system that can include a plurality of processors in the processing unit 2203. Alternatively, a single processor system may be employed.

Instructions for the operating system, the object-oriented programming system, the one or more recipes described herein, and applications or programs are located on storage devices, such as the HDD/SDD 2211, and are loaded into the main memory 2204 for execution by the processing unit 2203. The processes for embodiments described herein can be performed by the processing unit 2203 using computer usable program code, which can be located in a memory such as, for example, main memory 2204, ROM 2210, or in one or more peripheral devices connected to the bus 2216.

A bus system 2216 can be comprised of one or more busses. The bus system 1316 can be implemented using any type of communication fabric or architecture that can provide for a transfer of data between different components or devices attached to the fabric or architecture. A communication unit such as the modem 2209 (which can include a wireless modem employing one or more of GSM, CDMA, LTE, and/or 5G technologies) or the network adapter 2206 can include one or more devices that can be used to transmit and receive data.

Those of ordinary skill in the art will appreciate that the hardware depicted in FIG. 22 may vary depending on the implementation. Other internal hardware or peripheral devices, such as flash memory, equivalent non-volatile memory, or optical disk drives may be used in addition to or in place of the hardware depicted. Moreover, the data processing system 2200 can take the form of any of a number of different data processing systems, including but not limited to, client computing devices, server computing devices, tablet computers, laptop computers, thin clients, telephone or other communication devices, smartphones, personal digital assistants, and the like. Essentially, data processing system 2200 can be any known or later developed data processing system without architectural limitation.

EXAMPLES

Example 1

Figure 3:
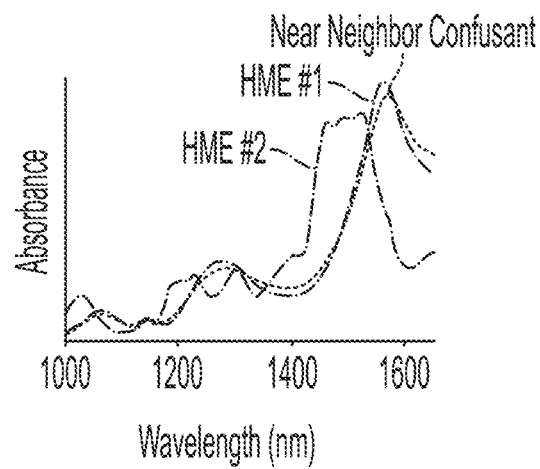
FIG. 3 depicts the underlying SWIR absorption spectroscopic signatures associated with HME 1 and HME 2, respectively.

Example 1 is multi-target detection that is in near achieved near real time. FIGS. 1-3 depicts representative breadboard test data and demonstrates CF imaging of SWIR interacted photons. The scene includes a target labeled HME 1, a confusant labeled HME Confusant, and an interferent labeled HME 2. In these examples, "HME" means "homemade explosive." Of these, the confusant is a close near neighbor to the target. The interferent is another similar, but distinct homemade explosive material.

During the steps of multi-target detection, the target (HME 1) and the interferent (HME 2) were combined into a single target group. In this Example, the CF was trained to distinguish the target (HME 1) from the remaining materials. The remaining materials are not particularly limited and are present throughout the field of view. A CF score image, shown in FIG. 1, is calculated as $(T1-T2)/(T1+T2)$, and the CF score image is converted to a detection image by applying a local decision making algorithm. According to the local decision making algorithm, once a score image is generated from the $(T1-T2)/(T1-T2)$ operation, a series of data filters are applied to decide what objects in the scene are candidate detections, followed by the removal of false alarms. If, after the data filters are applied and the false alarms are removed, the object persists, the local decision making algorithm determines that there is a detection corresponding to the algorithm. Following transformation of the CF score image by the local decision making algorithm, the image of FIG. 2 is generated. In FIG. 2, the two samples on the bottom left, corresponding to HME 1 and HME 2 are depicted in bright white in the grayscale drawing, which in color would be indicated by a false color such as green designating a target (HME 1) or interferent (HME 2). FIG. 3 depicts the spectra associated with the target (HME 1), the interferent (HME 2), and the confusant that is a near neighbor to the target. Despite the spectral dissimilarity of the target (HME 1) and the interferent (HME 2), the multi-target detection apparatus of Example 1 was able to differentiate target group containing the target and the interferent from the near neighbor confusant and the other materials present in the scene. The multi-target detection apparatus of Example 1 is capable of real-time detection for multiple targets.

Example 2

Figure 4:
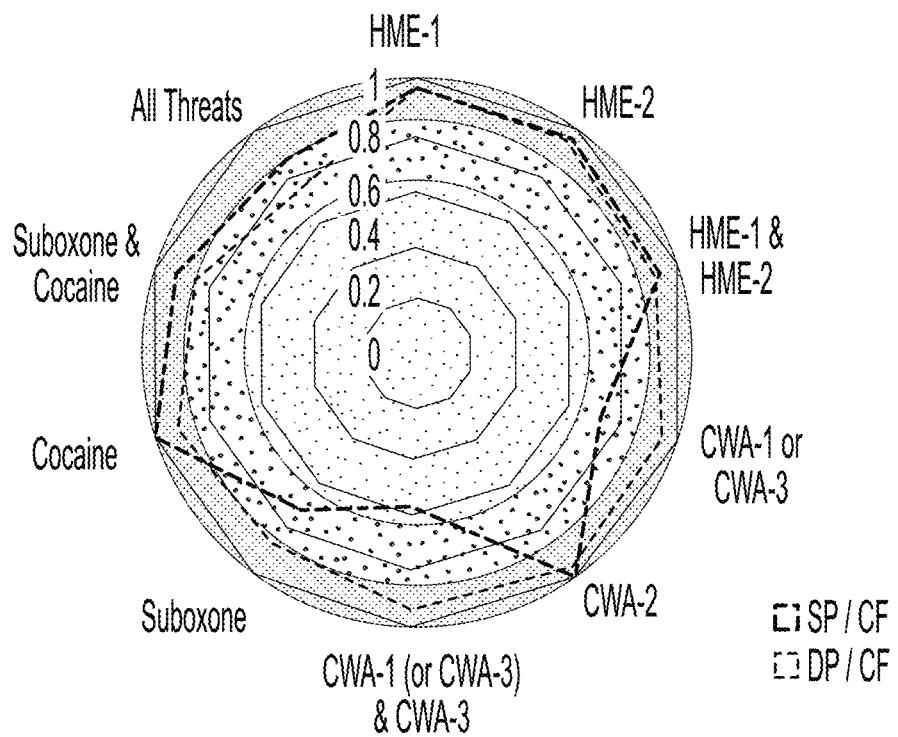
FIGS. 4-5 depict dual polarization versus single polarization conformal filter (CF) imaging results when assessing discrimination of target from all remaining samples in the scene (FIG. 4) versus discrimination of target from CONOPs-specific samples in the scene (FIG. 5).
Figure 5:
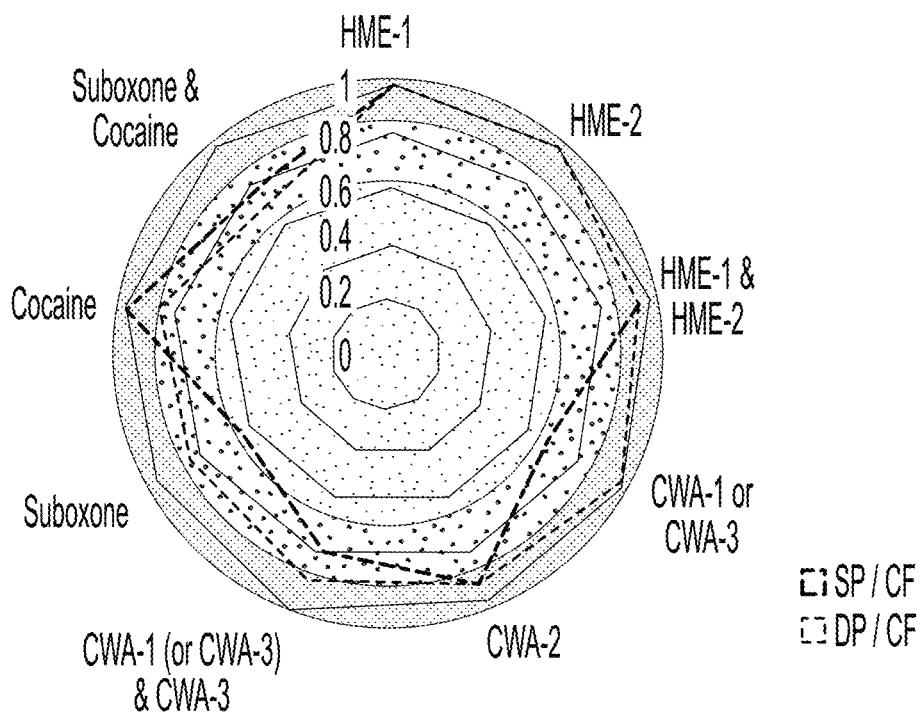

In another Example, FIGS. 4 and 5 depict dual polarization versus single polarization imaging results, with each respective graph including a comparison. Each of FIGS. 4 and 5 depict conformal imaging results when assessing specified targets relative to all remaining Common Sample Set (CSS) targets and Concept of Operations (CONOPs)-specific CSS targets, respectively, in a scene. In FIGS. 4 and 5, the Area Under the Receiving Operating Curve (AUROC) is depicted for single polarization and dual polarization. The AUROC is plotted in FIGS. 4 and 5 for All Threats, HME-1, HME-2, a combination of HME-1 and HME-2, CWA-1 or CWA-3, CWA-2, CWA-1 or CWA-3 and CWA-3, suboxone, cocaine, and a combination of suboxone and cocaine. Each of these were different samples that were tested to determine the effectiveness of the multi-target detection apparatus. TABLE 1 below summarizes the meaning of the AUROC values.

TABLE 1

| AUROC Value | Result |
| --- | --- |
| 1.0 | Perfect detection; complete distinction between target and background |
| >0.85 | Acceptable |
| 0.65 ≤ AUROC ≤ 0.85 | Marginal |
| <0.65 | Unacceptable |
| 0.5 | Poor, "flip the coin" |

Example 3

Figure 6:
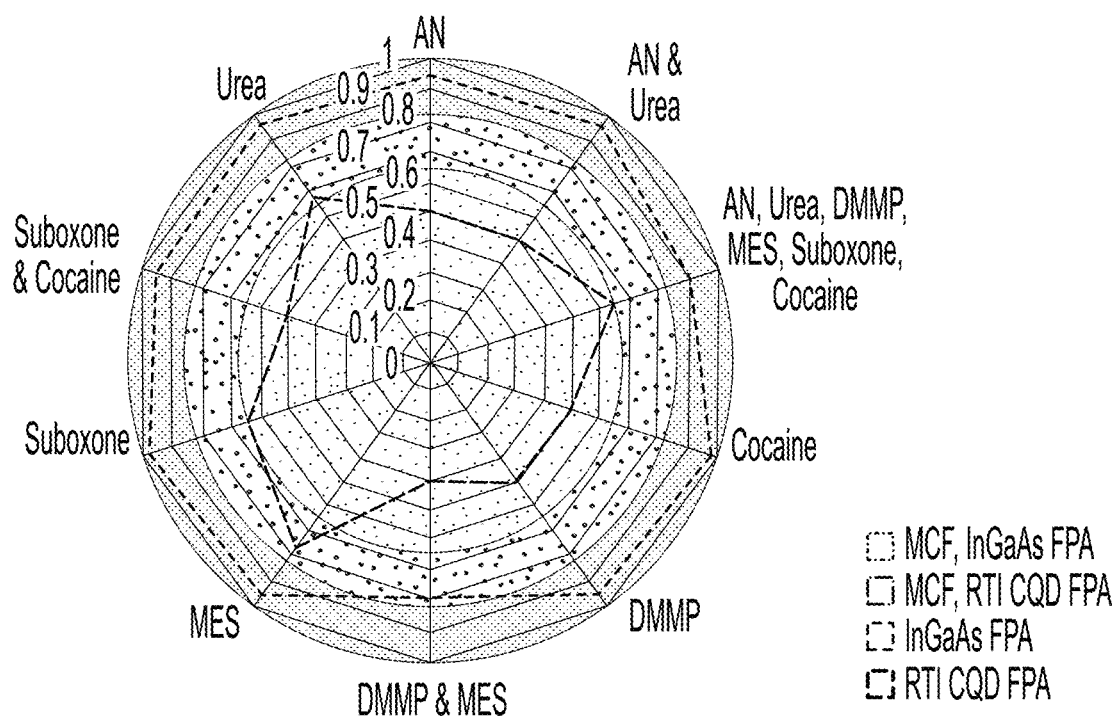
FIGS. 6-7 depict sequential, multispectral results obtained with a tunable filter (MCF).
Figure 7:
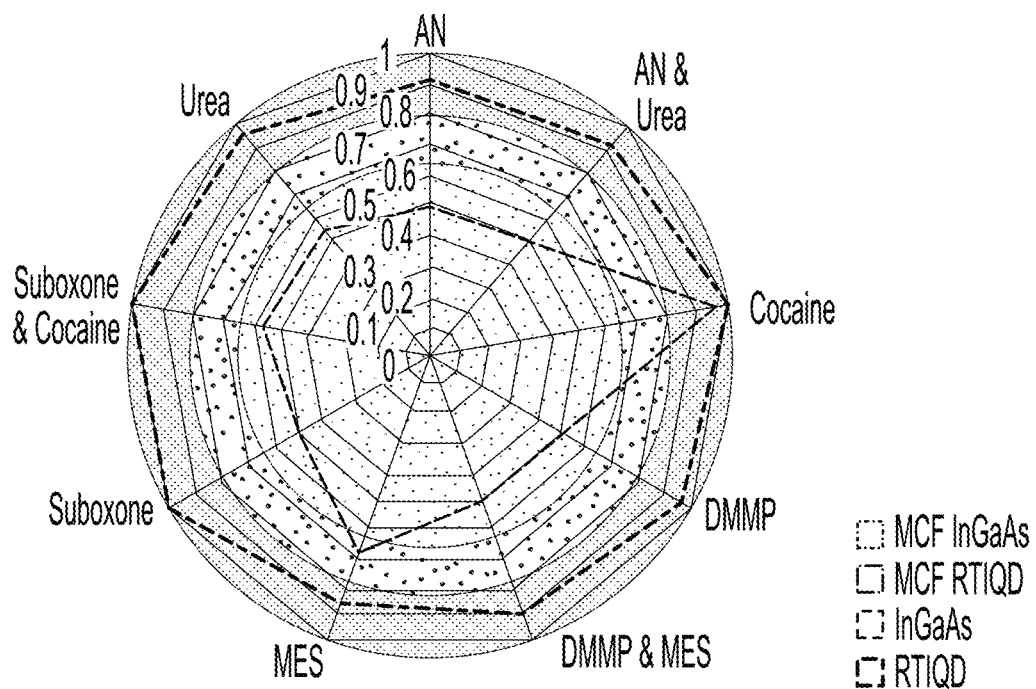
Figure 8:
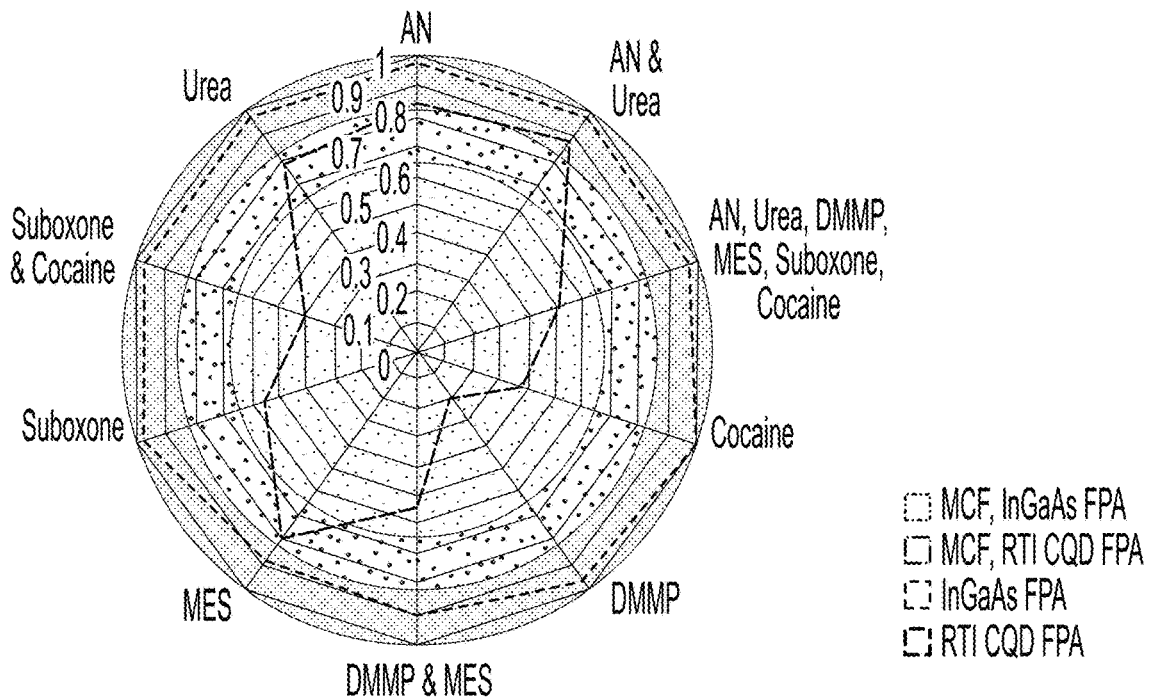
FIG. 8 depicts assessing a target or a target group versus all remaining CSS materials.
Figure 9:
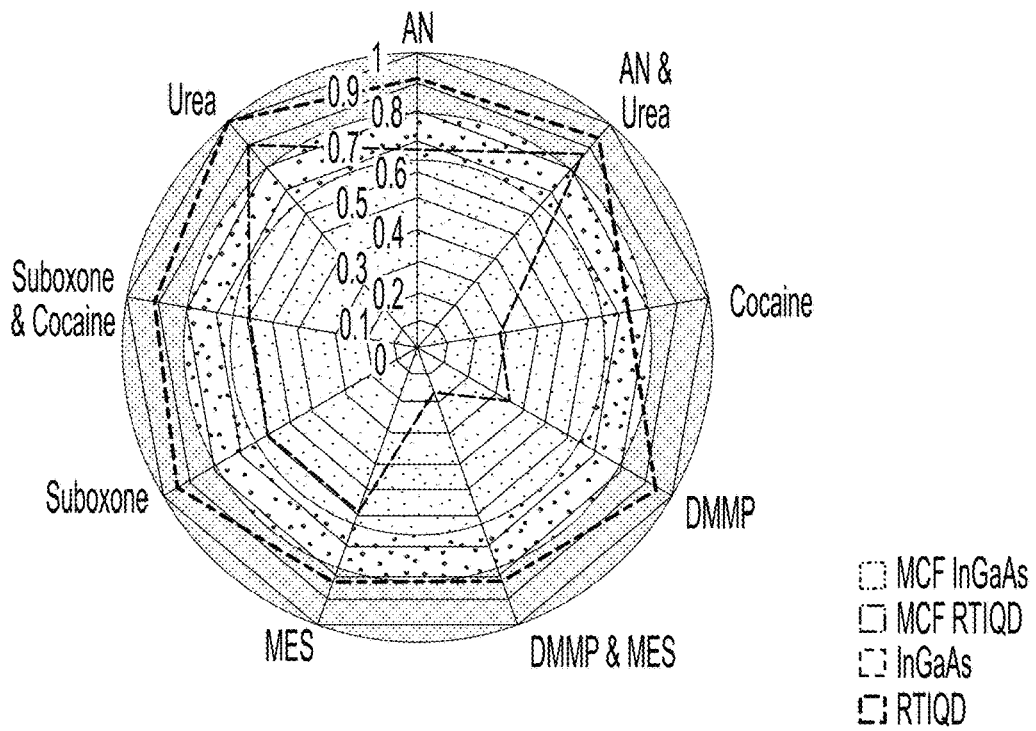
FIG. 9 depicts assessing target or target groups versus only a representative CONOPS-specific materials within the CSS.
Figure 10:
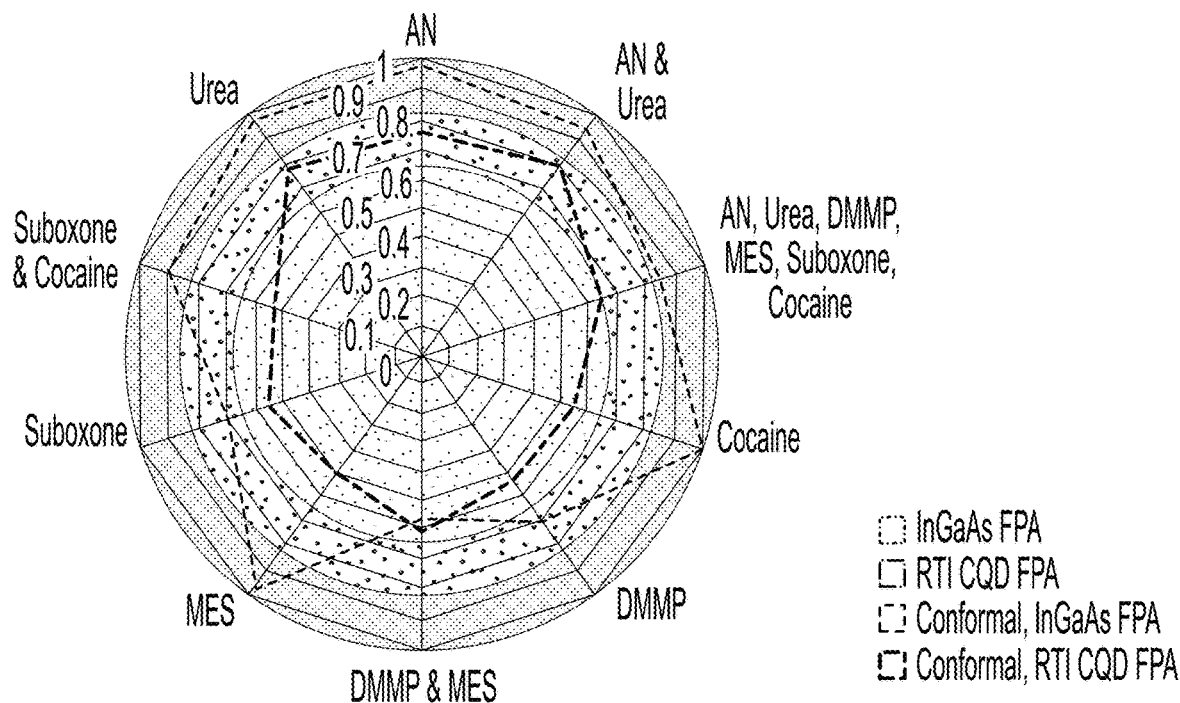
FIGS. 10-11 depict conformal imaging results obtained from analyzing the specified targets relative to all remaining CSS materials and CONOPs-specific materials, respectively, in a scene.
Figure 11:
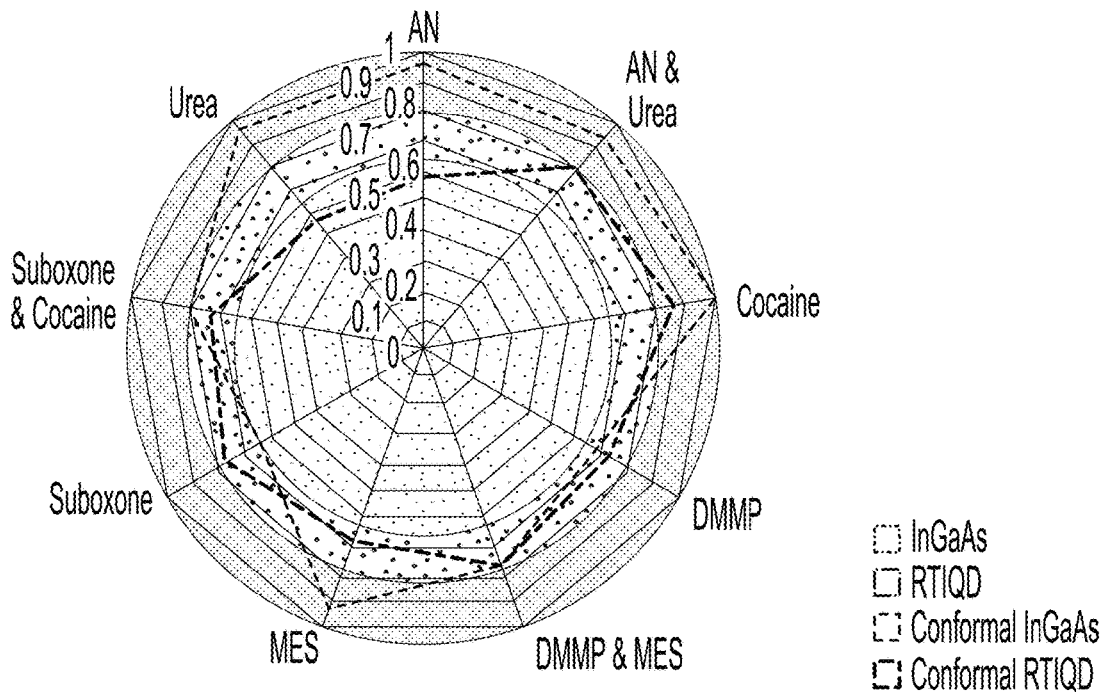

FIG. 6 and FIG. 7 depict sequential, multispectral results obtained with a tunable filter (MCF). FIG. 6 is a depiction of assessing a target or target group versus all of the remaining CSS materials. FIG. 7 depicts assessing targets or target groups versus only the respective CONOPs-specific materials within the CSS. FIG. 8 depicts assessing a target or a target group versus all remaining CSS materials. FIG. 9 depicts assessing target or target groups versus only a representative CONOPS-specific materials within the CSS, and also depicts sequential, hyperspectral results obtained with a tunable filter. FIG. 10 and FIG. 11 depict conformal imaging results obtained from analyzing the specified targets relative to all remaining CSS materials and CONOPs-specific materials, respectively, in a scene. The data depicted for FIGS. 6-11 includes different results analyzed with a multi-target detection apparatus that incorporated both an InGaAs camera chip and a CQD (Colloidal Quantum Dot) camera chip. The AUROC values are plotted for each test, and Table 1 again provides the meaning of the AUROC values.

Example 4

Figure 12:
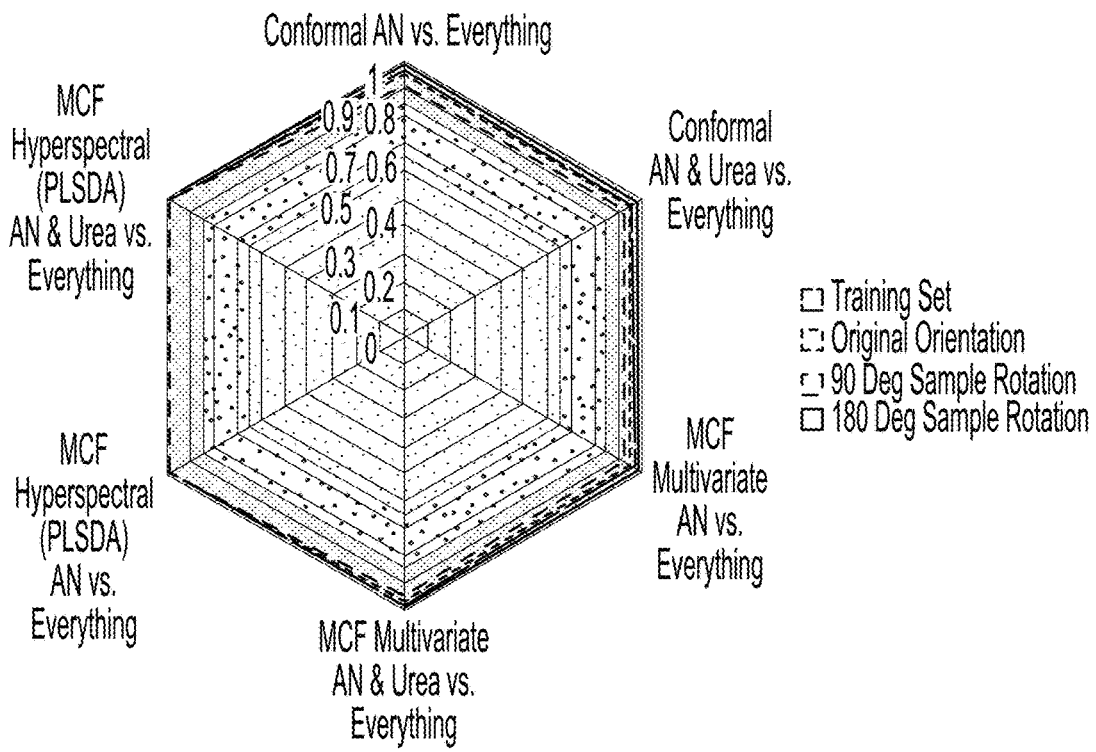
FIGS. 12 and 13 demonstrate the impact on AUROC performance when the samples are rotated.
Figure 13:
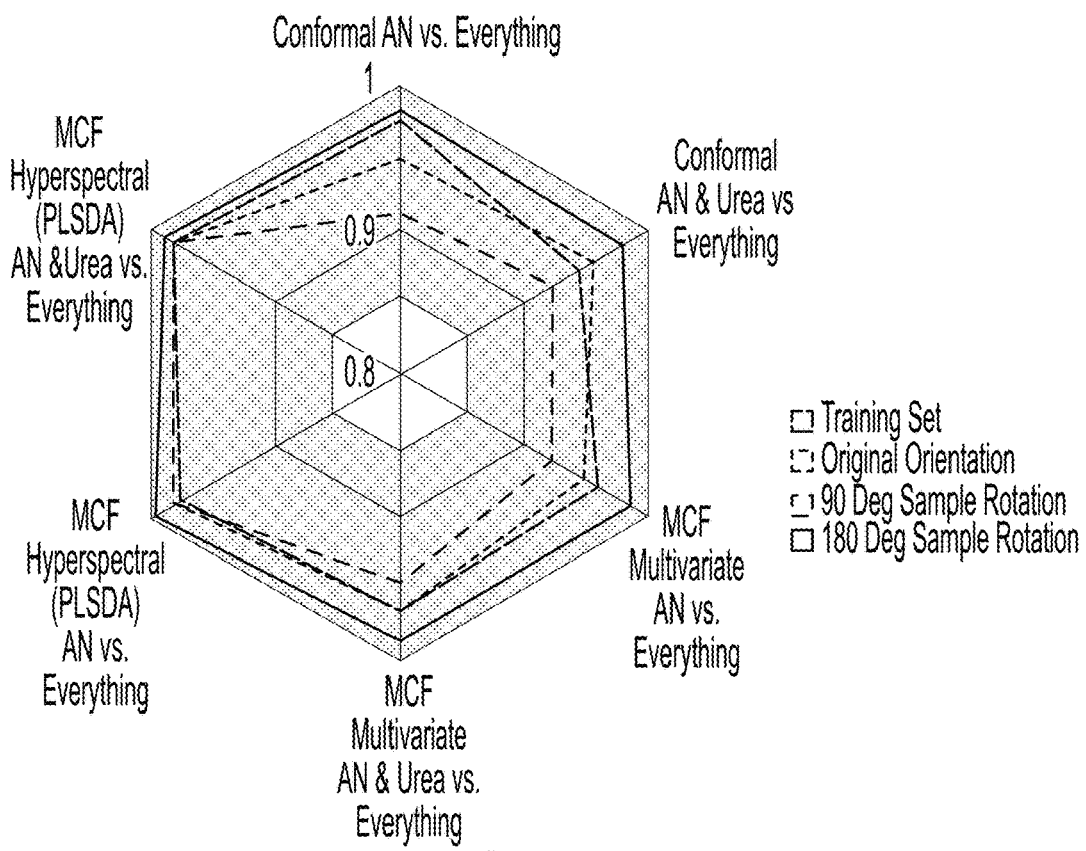

The multi-target detection apparatus analyzed targets that were physically rotated in place in an attempt to avoid detection or to reduce the effectiveness of the multi-target detection apparatus. FIG. 12 demonstrates that when the samples were rotated, the impact on AUROC performance was negligible, with all samples achieving AUROC values greater than 0.9. FIG. 13 is the same as FIG. 12 but is rescaled with a lower AUROC bound of 0.8, and again shows in detail that all samples achieve AUROC values greater than 0.9. Most of the samples achieve AUROC values greater than 0.95.

Example 5

Figure 14:
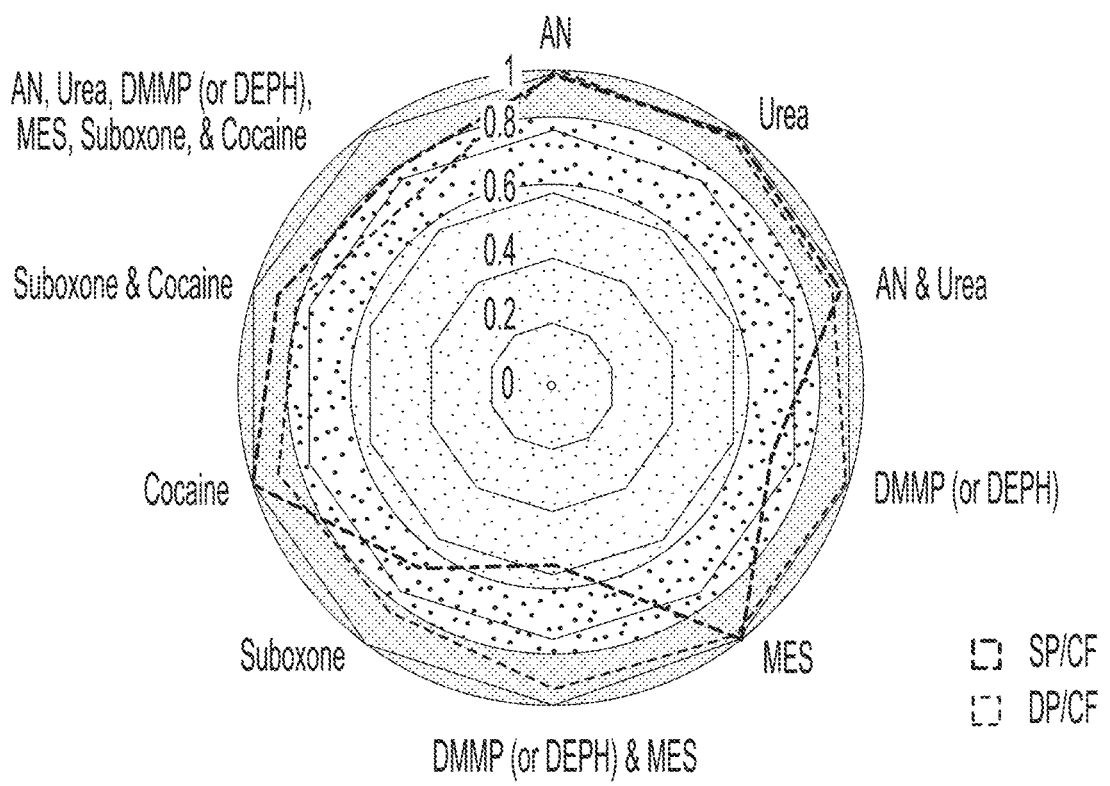
FIGS. 14-15 show the results of a dual polarization multi-detection apparatus versus a single polarization multi-detection apparatus when assessing specified targets.
Figure 15:
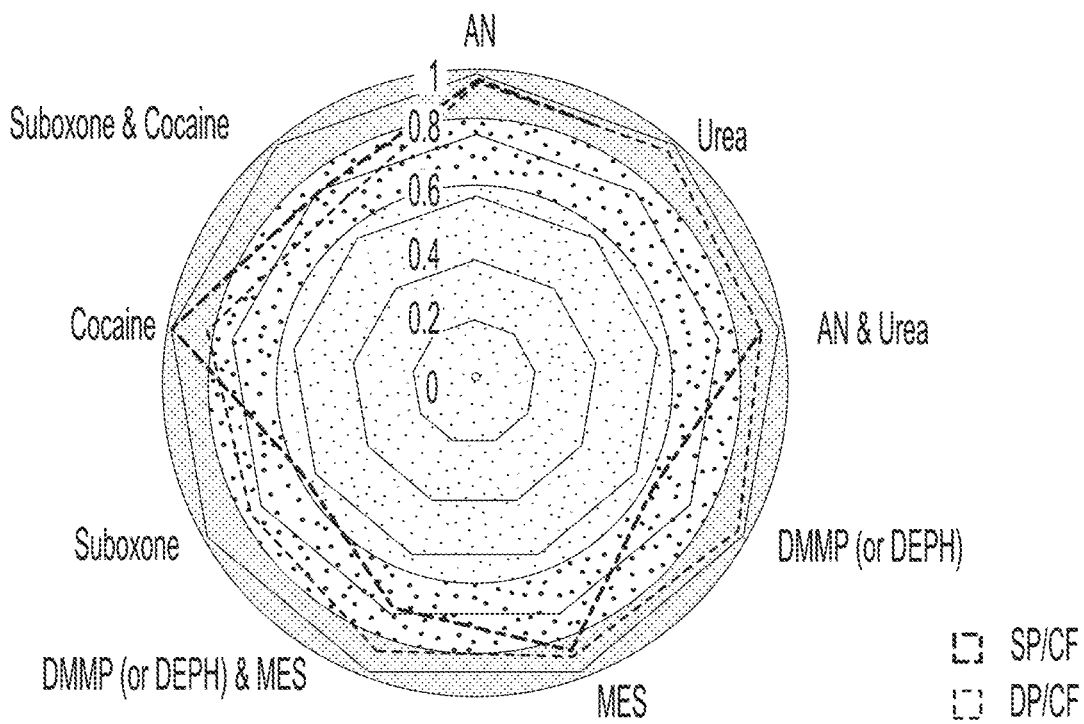

FIG. 14 and FIG. 15 show the results of a dual polarization multi-detection apparatus versus a single polarization multi-detection apparatus when assessing specified targets. FIG. 14 depicts CSS AUROC results for targets evaluated versus all remaining CSS materials in the same scene. FIG. 15 depicts targets evaluated versus CONOPs-specific CSS material in the same scene. In FIGS. 14 and 15, CP/CF denotes single polarization conformal filter, and DP/CF denotes dual polarization conformal filters.

Example 6

Figure 16:
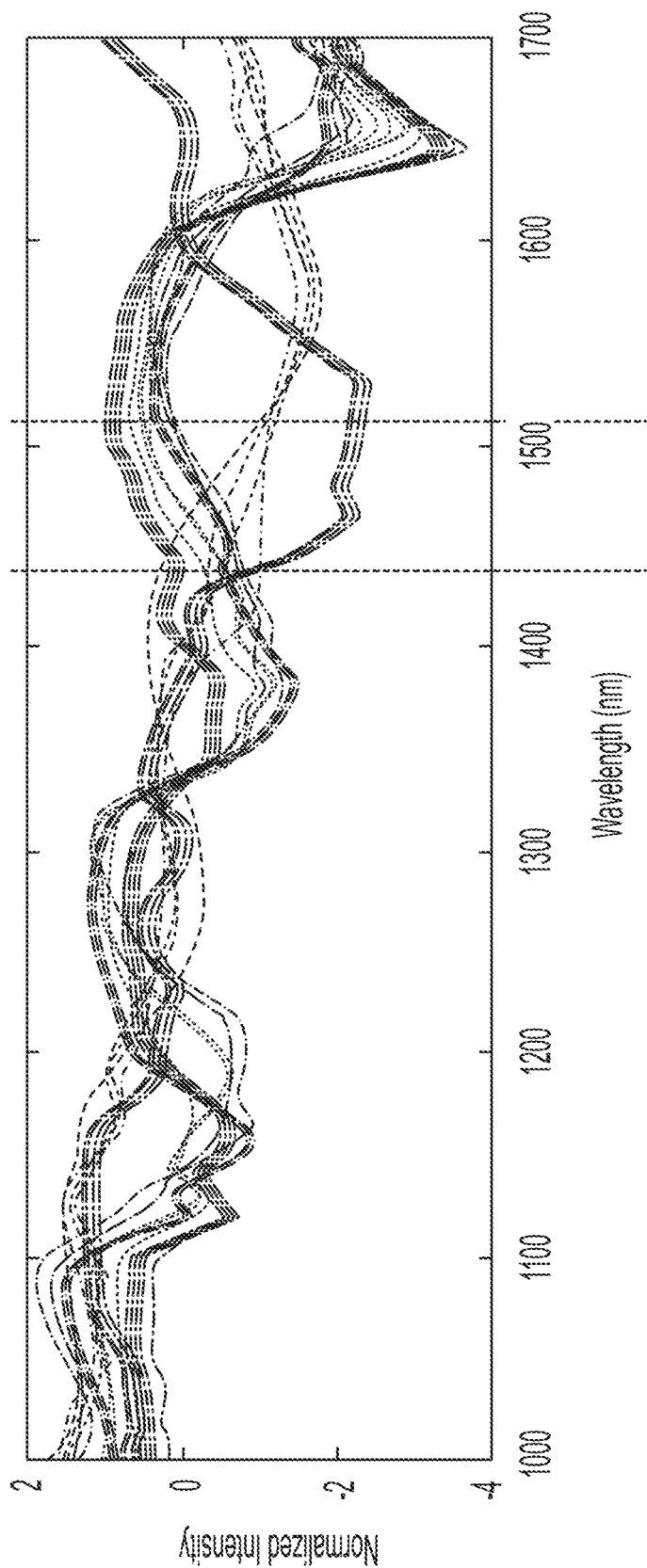
FIG. 16 depicts the reflectance spectra of ten explosive samples.
Figure 17:
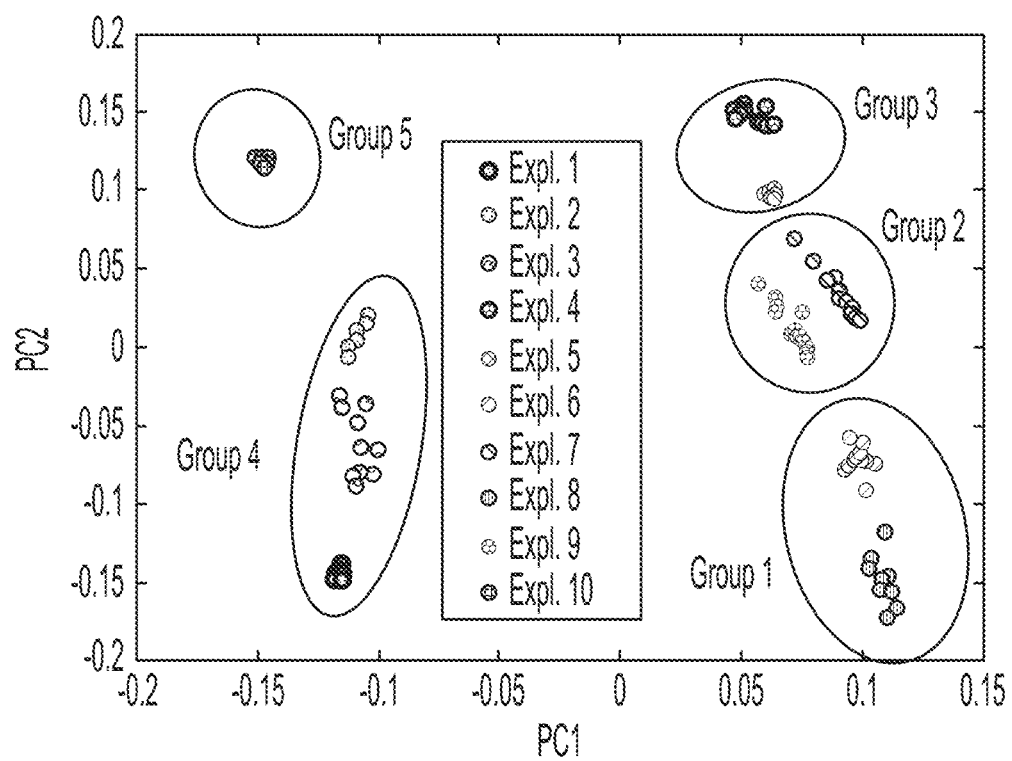
FIG. 17 depicts the principle component analysis in certain embodiments of the reflective spectra of ten explosive and explosive precursor targets.

An experiment was performed to determine selectivity, or detection of multiple target groups. Ten (10) explosive and explosive precursor targets were placed into one of five (5) target groups based on a principle component analysis of their reflectance spectra. FIG. 16 depicts the reflectance spectra of all ten of the explosives, plotted by normalized intensity versus wavelength (nm) in the NIR-SWIR spectral range. The principle component analysis of the reflective spectra of the ten explosive and explosive precursor targets is plotted in FIG. 17.

Figure 18:
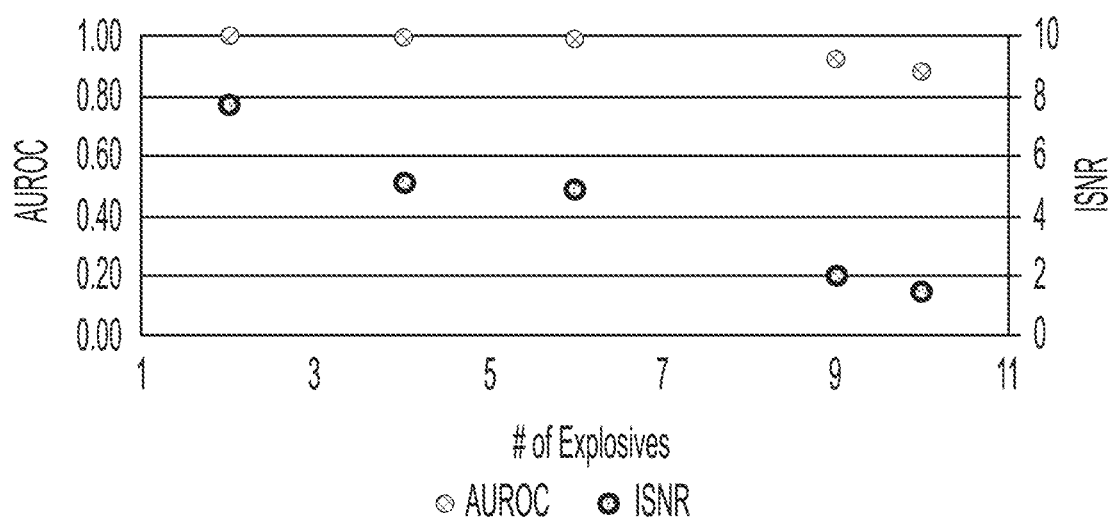
FIG. 18 shows the gradual reduction in certain embodiments of the ISNR and AUROC metrics as targets are added to a target group.

Targets were added to target groups such that the most spectrally similar materials were added together first. The inventors found that as targets were added to the target group, both the Image Signal-to-Noise Ratio (ISNR) and AUROC progressively decreased. This degradation is shown in FIG. 18, which plots the AUROC and ISNR values on the left and right vertical scales, respectively, versus the total number of explosive targets present in the target group.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," et cetera). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. It will be further understood by those within the art that if a specific number of an introduced claim recitation is intended, such an intent will be explicitly recited in the claim, and in the absence of such recitation no such intent is present.

For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, et cetera. As a non-limiting example, each range discussed herein can be readily broken down into a lower third, middle third and upper third, et cetera. As will also be understood by one skilled in the art all language such as "up to," "at least," and the like include the number recited and refer to ranges that can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

The invention claimed is:

1. A method of detecting at least two targets, the method comprising:
    illuminating a first target with illuminating photons to thereby generate first interacted photons;
    illuminating a second target with illuminating photons to thereby generate second interacted photons;
    optically separating portions of the first interacted photons and the second interacted photons;
    filtering the first interacted photons and the second interacted photons with at least one of a conformal filter (CF) and a multi conjugate filter (MCF), wherein the CF or MCF is tuned with a single first recipe, to thereby produce filtered first interacted photons and filtered second interacted photons;
    detecting, with an image sensor, a spectral signature of the first target and the second target by analyzing the filtered first interacted photons and the filtered second interacted photons; and
    wherein the at least one CF or MCF is a pixelated filter that comprises multiple CF or MCF arranged into a matrix configuration.

2. The method of claim 1, wherein the first interacted photons and the second interacted photons are optically separated by polarizing and are each separately polarized.

3. The method of claim 2, wherein the first target and the second target are detected in real time.

4. The method of claim 1, wherein the first recipe that tunes the CF or MCF does not change.

5. The method of claim 4, wherein the first target and the second target are detected in real time.

6. The method of claim 1, wherein the first target and the second target are detected in real time.

7. The method of claim 1, wherein the illuminating photons are modulated.

8. The method of claim 1, further comprising:
    filtering the first interacted photons and the second interacted photons with the at least one of the CF and MCF, wherein the CF or MCF is tuned with a single second recipe.

9. A multi-target detection apparatus, the multi-target detection apparatus comprising:
- at least one optical separator to separate portions of one or more of first interacted photons from a first target and second interacted photons from a second target;
- at least one of a conformal filter (CF) and a multi conjugate filter (MCF) positioned within an optical path of one or more of the first interacted photons and the second interacted photons;
- at least one CF or MCF that causes each of the first interacted photons and the second interacted photons to be tuned with a single first recipe to thereby produce filtered first interacted photons and filtered second interacted photons;
- an image sensor positioned within the optical path of the one or more first interacted photons and within the optical path of the second interacted photons in order to collect one or more of the filtered first interacted photons and the filtered second interacted photons;
- at least one processor that during operation of the multi-target detection apparatus tunes the CF or MCF to the single first recipe to thereby produce the first interacted photons and the second interacted photons; and
- wherein the at least one CF or MCF is a pixelated filter that comprises multiple CF or MCF arranged into a matrix configuration.

10. The apparatus of claim 9, wherein the optical separator is a polarizer and during operation, the first interacted photons and the second interacted photons are each separately polarized.

11. The apparatus of claim 10, wherein during operation of the apparatus, the first target and the second target are detected in real time.

12. The apparatus of claim 9, wherein the first recipe that tunes the CF or MCF does not change during operation of the apparatus.

13. The apparatus of claim 12, wherein during operation of the apparatus, the first target and the second target are detected in real time.

14. The apparatus of claim 9, wherein during operation of the apparatus, the first target and the second target are detected in real time.

15. A computer program product for detecting at least two targets, wherein the computer program product is embodied by instructions on a non-transitory computer readable storage medium that, when executed by a processor, cause:
- at least optical separator to optically separate one or more of the first interacted photons and the second interacted photons;
- at least one of a conformal filter (CF) and a multi conjugate filter (MCF) to be tuned with a single first recipe to thereby produce filtered first interacted photons and filtered second interacted photons, wherein the CF or the MCF are positioned within an optical path of the one or more of first interacted photons and second interacted photons;
- an image sensor to collect one or more of the filtered first interacted photons and the filtered second interacted photons, wherein the image sensor is positioned within the optical path of the one or more first interacted photons and within the optical path of the second interacted photons;
- the processor to tune the CF or MCF to a single first recipe and thereby produce first interacted photons and second interacted photons during operation of the multi-target detection apparatus; and
- wherein the at least one CF or MCF is a pixelated filter that comprises multiple CF or MCF arranged into a matrix configuration.

16. The computer program product of claim 15, wherein the optical separator is a polarizer and the instructions, when executed by a processor, further cause the polarizer to separately polarize the first interacted photons and the second interacted photons.

17. The computer program product of claim 16, wherein during operation, the first target and the second target are detected in real time.

18. The computer program product of claim 15, wherein the first recipe that tunes the CF or MCF does not change during operation.

19. The computer program product of claim 15, wherein during operation, the first target and the second target are detected in real time.

20. The computer program product of claim 15, wherein during operation, the first target and the second target are detected in real time.

21. The computer program product of claim 15, wherein the instructions when executed by the processor further cause an illumination source to modulate illuminating photons.

22. The computer program product of claim 15, wherein the instructions when executed by the processor further cause filtering the first interacted photons and the second interacted photons by tuning the CF or MCF to a second recipe.

* * * * *